United States Patent
Grein et al.

(10) Patent No.: US 11,530,634 B2
(45) Date of Patent: Dec. 20, 2022

(54) COALESCENCE SEPARATOR, IN PARTICULAR FOR USE IN A CRANKCASE VENTILATION SYSTEM, CRANKCASE VENTILATION SYSTEM AND USE OF COALESCENCE SEPARATOR

(71) Applicant: MANN+HUMMEL GmbH, Ludwigsburg (DE)

(72) Inventors: Thomas Grein, Eggenstein-Leopoldshafen (DE); Markus Zuerker, Dudenhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 323 days.

(21) Appl. No.: 16/857,654

(22) Filed: Apr. 24, 2020

(65) Prior Publication Data
US 2020/0248597 A1 Aug. 6, 2020

Related U.S. Application Data

(63) Continuation of application No. PCT/EP2018/079458, filed on Oct. 26, 2018.

(30) Foreign Application Priority Data

Oct. 27, 2017 (DE) .......................... 102017010021.7

(51) Int. Cl.
*B01D 59/50* (2006.01)
*F01M 13/04* (2006.01)
(Continued)

(52) U.S. Cl.
CPC ......... *F01M 13/04* (2013.01); *B01D 39/2024* (2013.01); *B01D 46/0031* (2013.01);
(Continued)

(58) Field of Classification Search
CPC ........... F01M 13/04; F01M 2013/0438; B01D 2239/1233; B01D 39/1623
(Continued)

(56) References Cited

U.S. PATENT DOCUMENTS 6,187,073 B1 * 2/2001 Gieseke ............ B01D 46/2411
55/318
9,149,748 B2 10/2015 Nagy et al.
(Continued)

FOREIGN PATENT DOCUMENTS

DE 19520504 A1 12/1996
WO 2015079394 A1 6/2015

*Primary Examiner* — Long T Tran
*Assistant Examiner* — James J Kim (57) ABSTRACT

A coalescence separator for separating liquid droplets from a gas flow has a gas inlet and a gas outlet. A multi-layer structure of a plurality of individual layers of a coalescence filter medium is arranged between the gas inlet and the gas outlet, wherein the coalescence filter medium is provided with a glass fiber paper with glass fibers. The individual layers of the coalescence filter medium each have an individual layer thickness of more than 0.8 mm and maximally 5 mm, a grammage of greater than 80 g/m² and less than 500 g/m², and an air permeability of 350 l/m²s to 1,800 l/m²s. The multi-layer structure has between 2 and 80 of the individual layers.

26 Claims, 4 Drawing Sheets

(51) Int. Cl.
*B01D 39/20* (2006.01)
*B01D 46/00* (2022.01)

(52) U.S. Cl.
CPC .. *B01D 2239/1258* (2013.01); *B01D 2275/10* (2013.01); *F01M 2013/0438* (2013.01)

(58) Field of Classification Search
USPC .......................................................... 55/482
See application file for complete search history.

(56) References Cited

U.S. PATENT DOCUMENTS

| | | |
|---|---|---|
| 2012/0107588 A1 | 5/2012 | Sealey et al. |
| 2012/0234748 A1* | 9/2012 | Little ........................ D04H 5/04 210/488 |
| 2014/0033668 A1* | 2/2014 | Kleynen ................ B01D 29/21 55/502 |
| 2014/0130469 A1* | 5/2014 | Nagy ................ B01D 39/1615 55/486 |
| 2017/0341006 A1* | 11/2017 | Boesner ............. B01D 39/1623 |

* cited by examiner

COALESCENCE SEPARATOR, IN PARTICULAR FOR USE IN A CRANKCASE VENTILATION SYSTEM, CRANKCASE VENTILATION SYSTEM AND USE OF COALESCENCE SEPARATOR

CROSS-REFERENCE TO RELATED APPLICATIONS

This application is a continuation application of international application No. PCT/EP2018/079458 having an international filing date of 26 Oct. 2018 and designating the United States, the international application claiming a priority date of 27 Oct. 2017 based on prior filed German patent application No. 10 2017 010 021.7, the entire contents of the aforesaid international application and the aforesaid German patent application being incorporated herein by reference.

BACKGROUND OF THE INVENTION

The invention concerns a coalescence separator for separating liquid droplets from a gas flow, in particular for use in a crankcase venting system, comprising a gas inlet, a gas outlet, and a multi-layer structure of a coalescence filter medium arranged between the gas inlet and the gas outlet; its use in a crankcase ventilation system; and a crankcase ventilation system.

In piston internal combustion engines, an oil-containing, in particular oil aerosol containing, leakage gas—the so-called blow-by gas—is produced in the crankcase. Its return into the combustion process is mandated by law in many countries in the meantime and is realized in so-called closed crankcase venting (CCV) systems, as disclosed, for example, in DE 10 2016 005 357 A1. The most important tasks of a crankcase venting (CCV) system include the oil separation and oil return into the crankcase as well as the regulation of the crankcase pressure. For this purpose, in such systems for separating aerosols, mainly oil aerosols, coalescence separators may be employed in addition to inertial separators. In this context, due to exhaust gas legislation that is becoming more stringent, the requirements in regard to oil separation has increased steadily in the past years in order to protect emissions-relevant engine components such as exhaust gas turbocharger, charge air coolers or sensors from a performance loss or failure due to oil contamination. This is becoming more important, in particular in closed CCV systems, because crankcase gases are not released into the environment but are returned into the combustion process. Therefore, the importance of oil separation resides not solely in minimizing the oil consumption but, today, it provides primarily a significant contribution in regard to compliance with the exhaust gas legislation and function of important components over the service life of the vehicle.

It is known to employee for such applications coalescence filter media (also called coalescing filter media). Such filter media are known to a person of skill in the art as semifinished webs which are produced in continuous processes (for example, paper, spinning or nonwoven processes) and supplied in roll form and processed from the roll. In coalescence filter media employed for liquid separation, the oil droplets get caught at the fibers and combine to larger droplets that then drain by gravity. Known for this purpose are mixed filter media within a mass weight range of appr. 60-70 g/m² which in general contain coarse plastic fibers and between 10% and 60% glass fibers, wherein the plastic fibers have primarily a structural function and the finer glass fibers are meant to generate an efficient separation effect. In this context, melt consolidation processes for binding glass and plastic fibers are used, for example.

SUMMARY OF THE INVENTION

The invention has the object to further develop a coalescence separator of the aforementioned kind such that its function is optimized, in particular that the pressure loss of the coalescence separator is improved.

This object is solved by a coalescence separator that is characterized in that the coalescence filter medium comprises a glass fiber paper with an individual layer thickness of more than 0.8 mm and maximally 5 mm, a grammage of the individual layer of greater than 80 g/m² and less than 500 g/m², and an air permeability of the individual layer of 350-1,800 l/m²s. The object is further solved by its use in an in particular closed crankcase venting system of an internal combustion engine, preferably without a further fine separator or further fine separation layer.

Thus, the invention is based on using a multi-layer structure of a wet-laid glass fiber paper for oil separation. The multi-layer structure according to the invention with its open structure can be used surprisingly as an efficient final separator or as the only separation stage, in particular, no further fine separation stages or fine separation layers are required in addition to the glass fiber paper which is used in the multi-layer structure.

The coalescence separator serves for separating liquid droplets from a gas flow, in particular for separating oil from a gas flow, preferably for separating oil droplets from the crankcase gas. The coalescence separator comprises preferably a gas inlet, a gas outlet, and a filter body arranged between the gas inlet and the gas outlet. Preferably, a multi-layer structure of a coalescence filter medium is used as filter body wherein, as coalescence filter medium, a glass fiber paper that is in particular wet-laid is used. The coalescence filter medium comprises preferably an individual layer thickness of more than 0.8 mm and further preferred maximally 5 mm. The coalescence filter medium comprises preferably a grammage of the individual layer of greater than 80 g/m², preferably greater than 100 g/m², particularly preferred greater than 180 g/m², and further preferred less than 500 g/m². The coalescence filter medium comprises preferably an air permeability of the individual layer of 350-1,800 l/m²s.

In a preferred embodiment, the multi-layer structure comprises between 2 and 80 layers of the coalescence filter medium that are preferably immediately arranged on each other and are either stacked or wound. Preferably between 2 and 40, particularly preferred between 4 and 40, and optimally between 4 and 20 layers are employed. The layers stacked on each other advantageously form, as a unit, the structure that is decisive for the liquid separation. In this context, however also independent thereof, it is further preferred that the finest separation stage of the coalescence separator is formed by the multi-layer structure and/or the coalescence filter medium. The structure which is formed by the coalescence filter medium has the advantage that, in particular despite the very open structure, a separation effect that is sufficient for the application can be achieved so that no downstream fine separator or final separator and/or no additional finer separation layer, provided in the multi-layer structure in addition to the coalescence filter medium, is required in order to achieve a separation that is sufficient for the application. Multi-layer structures which comprise no finer (fine) separation layers, i.e., finer than the coalescence filter medium, introduced into the multi-layer structure in addition to the coalescence filter medium are referred to as intermediate layer-free.

In a preferred embodiment, it is therefore provided that the multi-layer structure and/or the coalescence filter medium form the separation stage which determines the efficiency of the coalescence separator. Worded differently, the multi-layer structure is thus preferably intermediate layer-free.

In a preferred embodiment, the coalescence filter medium is a single layer structure, i.e., it has no composite structure with two or a plurality of separation-effective layers that are, for example, laminated on each other. This means that the coalescence filter medium as such, i.e., as a web layer which is generally removed from a roll, is not already provided with a multi-layer composite structure of different separation-effective layers prior to forming a multi-layer structure from this filter medium. An example for this would be a glass fiber paper with a laminated nanofiber layer, or something similar. Thus, a multi-layer structure of a plurality of layers of the coalescence filter medium arranged on top of each other with, in flow direction, comparatively homogenous separation-effective structure can be made available. Further preferred, the coalescence filter medium is homogeneous, i.e., homogenous in itself. This means that the coalescence filter medium has no gradient structure that surpasses a standard level which, for example, could be caused by method modifications which would reinforce a method-effected minimal gradient structure predetermined by the paper method. Solidity differences between top half and bottom half of the coalescence filter medium are preferably in a range of less than 30%. The volume proportion that is occupied by the solid material is to be understood as solidity.

In an embodiment, the total grammage of the multi-layer structure (i.e., the grammage of the individual layer of the coalescence filter medium multiplied by the number of layers) is at least 500 g/m$^2$, preferably at least 760 g/m$^2$, particularly preferred at least 1,000 g/m$^2$. Moreover, the total grammage of the multi-layer structure in an embodiment is maximally 10,200 g/m$^2$, preferably maximally 8,000 g/m$^2$, particularly preferred maximally 5,100 g/m$^2$. In this range, a good application-related separation degree of oil contained in the crankcase gas can be achieved.

In a preferred embodiment, the total air permeability of the multi-layer structure is less than 350 l/m$^2$s and greater than 15 l/m$^2$s, preferably between 200 l/m$^2$s and 15 l/m$^2$s, particularly preferred between 180 l/m$^2$s and 30 l/m$^2$s. In this way, a pressure loss as minimal as possible can be realized with a sufficient separation performance.

In a preferred embodiment, the product of air permeability and grammage of an individual layer of the coalescence filter medium amounts to between 110 g/m*s and 220 g/m*s, preferably between 140 g/m*s and 180 g/m*s. It has been found that in this range a good separation performance can be achieved while the pressure loss is not too high at the individual layer.

In an embodiment, two or more different coalescence filter medium layers are employed for the multi-layer structure wherein, however, each of the individual layers comprises an individual layer thickness of more than 0.8 mm and maximally 5 mm, a grammage of the individual layer of greater than 80 g/m$^2$ and less than 500 g/m$^2$, and an air permeability of the individual layer of 350-1,800 l/m$^2$s, wherein it is particularly preferred that each of the individual layers comprises a product of air permeability and grammage of the individual layer of the coalescence filter medium between 110 g/m*s and 220 g/m*s, preferably between 140 g/m*s and 180 g/m*s, wherein further preferred the products of air permeability and grammage coincide at least within a range of +/−10%. In this context, in particular coalescence filter medium layers with different grammages, in particular within the range of greater than 80 g/m$^2$, preferably greater than 100 g/m$^2$, particularly preferred greater than 180 g/m$^2$ and further preferred less than 500 g/m$^2$ can be combined in order to adjust for the respective application an optimal configuration with regard to pressure loss and separation degree.

In a preferred embodiment, the mass proportion of glass fibers in the coalescence filter medium amounts to at least 90%, preferably at least 93%, particularly preferred at least 95%.

In a preferred embodiment, the mass proportion of incinerable materials in the coalescence filter medium amounts to maximally 10%, preferably maximally 7%, particularly preferred maximally 5%. Incinerable materials in general constitute the remainder that goes beyond the glass fiber proportion and can contain binders, impregnations, and/or plastic fibers.

A large proportion of the glass fibers in the total weight has the advantage that almost the entire mass proportion provides a great contribution to the separation performance while in case of mixed fiber media in general the plastic fiber proportion in comparison to the glass fiber proportion provides a reduced contribution to the separation performance. Such a high glass fiber proportion has furthermore the advantage that a coalescence filter medium that is particularly stable regarding differential pressure can be achieved which experiences only a minimal deformation under pressure and thus only a minimal change of the separation behavior and pressure loss. Moreover, a high glass fiber proportion enables a structure that is especially openpored relative to the grammage. A high glass fiber proportion can furthermore be advantageous for the chemical stability.

In a preferred embodiment, it is provided that the coalescence filter medium comprises a binder with a mass proportion of maximally 10%, preferably maximally 7%, particularly preferred maximally 5%, that comprises preferably no two-component fibers, particularly preferred no melt fibers, and, for example, is an acrylate binder. A minimal binder/melt fiber proportion contributes to a proportion as large as possible of the fibers contributing optimally to the separation effect. A reduced binder proportion ensures that individual pores in a number as low as possible are closed by binders. It is generally preferred to forego structure-forming polymer fibers, i.e., polymer fibers forming a carrier matrix for finer separation-effective glass fibers, in particular melt fibers.

In a preferred embodiment it is provided that the grammage of the individual layer of the coalescence filter medium amounts to greater than 150 g/m$^2$, preferably greater than 180 g/m$^2$. This contributes to a good processability of the coalescence filter medium for the multi-layer structure.

In a preferred embodiment, it is provided that the air permeability of the individual layer of the coalescence filter medium amounts to at least 350 l/m$^2$s, preferably at least 600 l/m$^2$s. It has been found that even such a permeable coalescence filter medium can provide a satisfactory separation for use in case of CCV oil separators.

Preferably, the air permeability of the individual layers of the coalescence filter medium amounts to less than 1,700 l/m$^2$s.

In particular for coiled multi-layer structures, an air permeability of the individual layer in the range of greater than 600 l/m²s has been found to be advantageous, preferably in combination with the grammage of less than 260 g/m². In this context, particularly preferred is a maximum air permeability of the individual layer of less than 900 l/m²s, preferably in combination with a grammage of at least 180 g/m².

In a preferred embodiment, at least 90%, preferably at least 95%, of the glass fibers of the coalescence filter medium comprise a fiber diameter of greater than 2.5 µm, preferably greater than 3 µm.

Further preferred is a coalescence separator in which at least 90% of the glass fibers of the coalescence filter medium comprise a fiber diameter of less than 10 µm, preferably less than 8 µm. The limitation of the proportion of coarse fibers with diameters larger than 10 µm, ideally at least to a proportion of not greater than 10%, contributes to achieving an improved proportion of separation-effective fibers as well as fibers that increase the pressure loss in a comparatively minimal amount.

In a preferred embodiment, it is provided that at least 90% of the glass fibers of the coalescence filter medium contained in the coalescence filter medium comprise a fiber diameter greater than 2.5 µm, preferably between 2.5 µm and 8 µm. It is particularly preferred that at least 90% of the glass fibers of the coalescence filter medium contained in the coalescence filter medium comprise a fiber diameter between 3 µm or 3.5 µm and 7.5 µm. Independent thereof, but also advantageous in particular in the mentioned total range, it is furthermore advantageous when the glass fibers of the coalescence filter medium comprise an average fiber diameter (d50) between 4 µm and 6 µm, preferred between 4.5 µm and 6 µm, particularly preferred between 5 µm and 6 µm. In this way, good properties can be achieved, respectively, with regard to separation effect, pressure loss, and stability of the coalescence filter medium. The particularly preferred configuration with narrow tolerance between 5 and 6 µm represents the optimum in this context.

It has been found that a minimal proportion of glass fibers in the diameter range of less than 3 µm, i.e., a proportion of less than 10%, preferably less than 5%, in particular for a high total proportion of glass fibers in the coalescence filter medium, even for a coarser separation-effective structure in comparison to other media used in the CCV field, enable high separation degrees and can provide at the same time great advantages with regard to pressure loss and thus energy savings.

The invention concerns moreover the use of an afore described coalescence separator in an in particular closed crankcase venting system of an internal combustion engine, preferably without further fine separator or further fine separation layer, i.e., preferably the afore described coalescence separator forms the finest oil separator in the CCV system.

A crankcase venting system according to the invention comprises an afore described coalescence separator. Further preferred, the crankcase ventilation system is closed, i.e., a return of the crankcase gases, which have been purified in the coalescence separator, into the intake manifold or into the combustion process of the internal combustion engine through a conduit is taking place in operation. In an advantageous embodiment, the crankcase ventilation system comprises an excess pressure valve for protection of the crankcase from excess pressures and/or a pressure regulating valve for regulating the pressure in the crankcase.

For determining advantageous properties of the presently described coalescence filter medium, the following standards and measuring methods have been found suitable. The indicated values have been determined or are determinable by these regulations: material thickness analog to ISO 534, but with a load of 10 kPA; grammage according to DIN EN ISO 536; air permeability according to DIN EN ISO 9237 at 200 Pa (total air permeability corresponds to the air permeability of the individual layer divided by the number of layers); fiber diameter distribution in analogy to DIN 53811: 1970-07 in micro projection of the longitudinal view on the basis of appr. 300 measured fibers; average fiber diameter is weighted by number.

BRIEF DESCRIPTION OF THE DRAWINGS

As already explained above, there are various possibilities to configure and further develop the teachings of the present invention in an advantageous way. In this regard, on the one hand, reference is being had to the claims that depend from the independent claim; on the other hand, further embodiments, features, and advantages of the present invention will be explained in more detail in the following inter alia with the aid of the embodiment illustrated by FIGS. 1 to 3 as well as with further examples.

DESCRIPTION OF PREFERRED EMBODIMENTS

Figure 1:
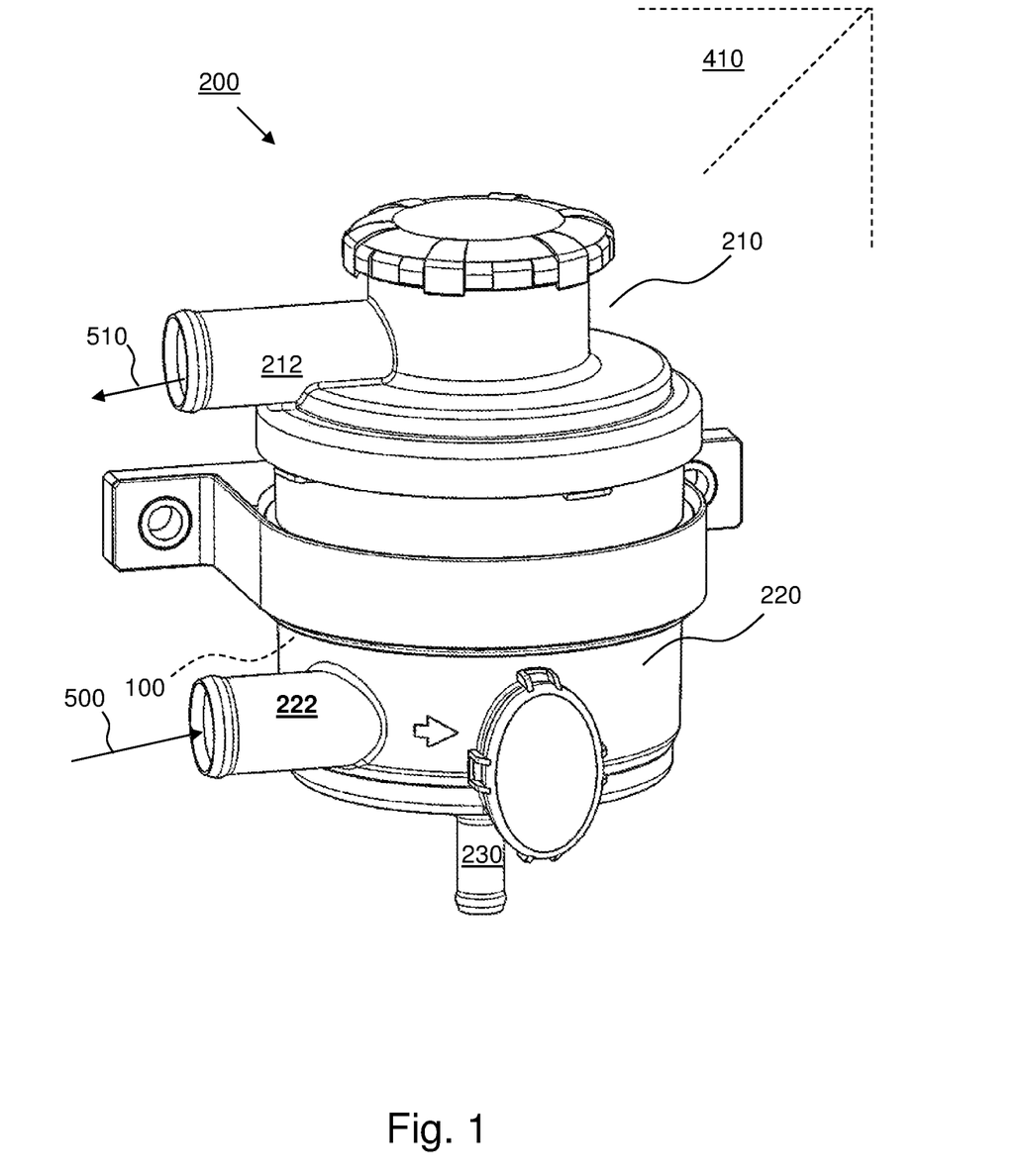
FIG. 1 shows in perspective illustration an embodiment of a crankcase venting (CCV) system with a coalescence separator according to the present invention.

FIG. 1 shows in a perspective view a crankcase 410 that is only schematically indicated and that comprises a coalescence separator 200 of a crankcase venting (CCV) system. The crankcase 410 is a component of an internal combustion engine. The internal combustion engine can be installed in a motor vehicle. The coalescence separator 200 is configured as a coalescence separator for oil-containing air from an interior of the crankcase 410. The oil-containing air in such applications is usually contaminated with combustion gases which leak from the cylinders as leakage gas into the crankcase. This mixture is regularly also referred to as crankcase gas wherein presently the term air will be used in the following for simplification.

Figure 2:
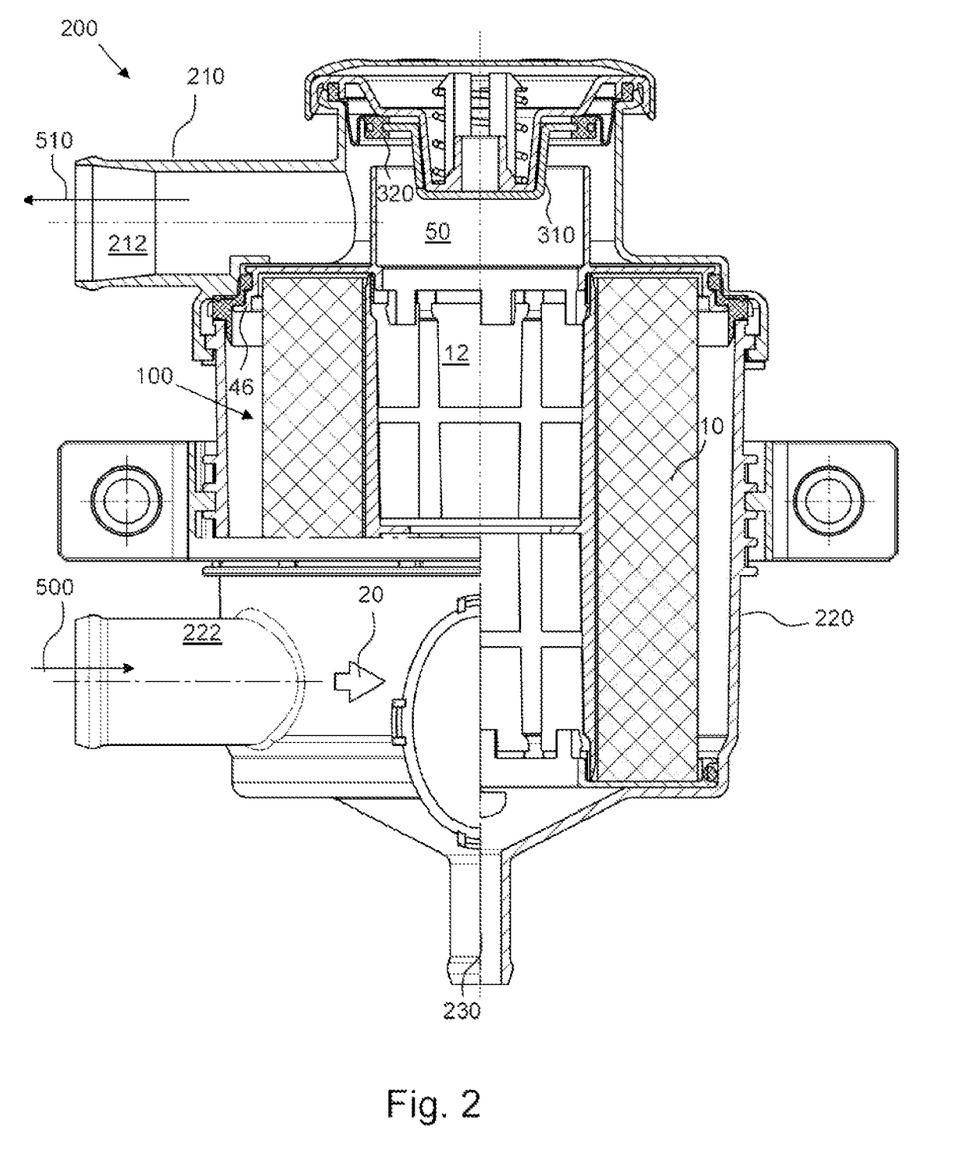
FIG. 2 shows in longitudinal section illustration the crankcase venting (CCV) system of FIG. 1.
Figure 3:
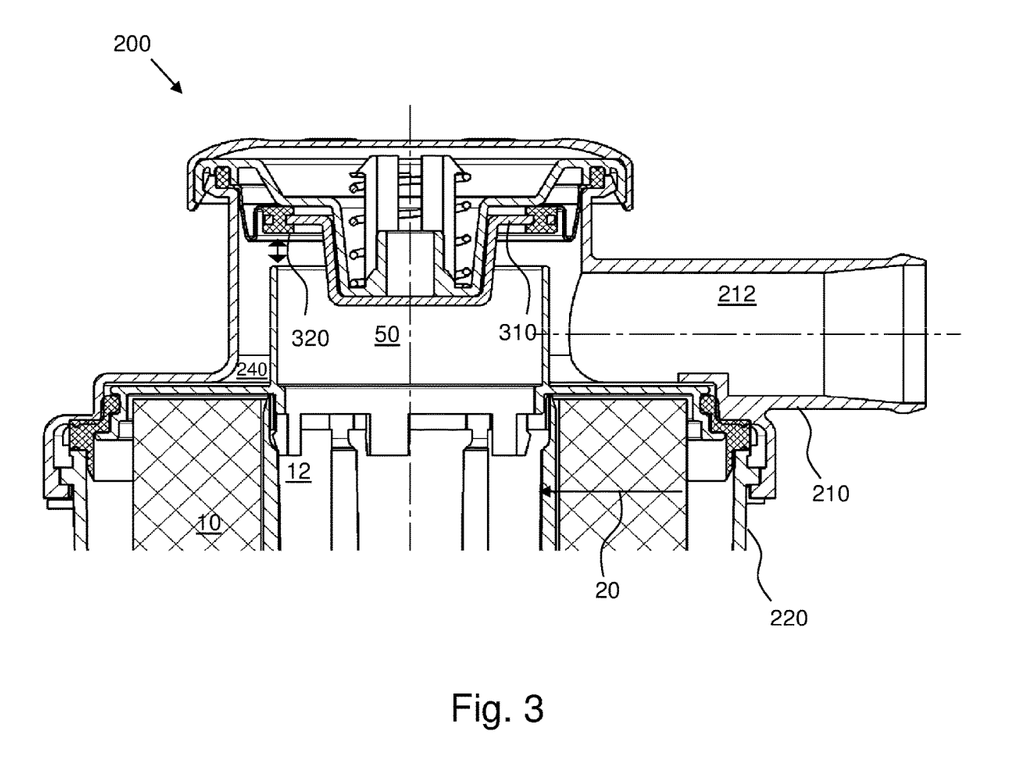
FIG. 3 shows in longitudinal section illustration a detail view of the coalescence separator of FIG. 2.

The coalescence separator 200 comprises a substantially oval cylindrical, in particular circular cylindrical, housing which is comprised of a first housing part 210, namely a housing cover, and a second housing part 220, namely a housing body. The second housing part 220 comprises an inlet 222 for the oil-containing air 500. In the housing, an in particular exchangeably insertable separating element 100 is arranged which comprises at least a multi-layer structure 10 of spirally shaped coalescence filter medium wound in multiple layers; see FIG. 2. In other embodiments, a stack is conceivable. The separating element 100 is hidden in FIG. 1 by the housing and therefore provided with a dashed reference character line. Within the housing 210, 220, the air 500 (a corresponding air flow 20 is indicated in FIG. 3 by an arrow) is purified by means of the multi-layer structure 10 of the coalescence filter medium. The resulting clean air 510 is guided from an interior 12 (FIG. 2) enclosed by the multi-layer structure 10 via a clean air discharge element 50 of the separator element 100 to a clean air outlet 212 of the housing cover 210 and from the clean air outlet 212 back into the intake manifold of the internal combustion engine. Separated oil is discharged via an oil outlet 230.

Figure 4:
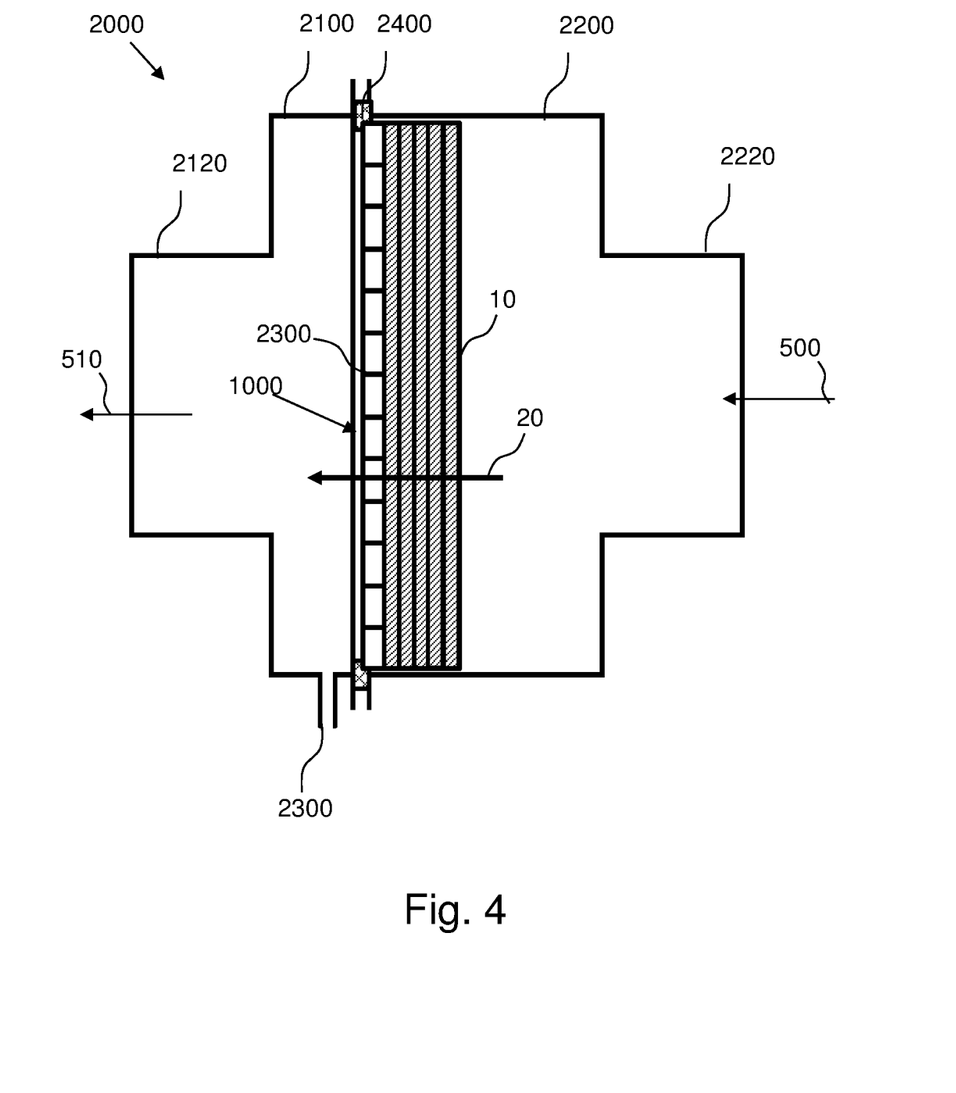
FIG. 4 shows in section illustration a detail view of a further coalescence separator.

In order to limit the crankcase vacuum to a defined value, the coalescence separator 200 comprises a pressure regulating valve. The pressure regulating valve, which is illustrated, for example, in FIGS. 2 and 3, has a valve closure body 310 which is surrounded by a valve closure body sealing element 320, preferably by a membrane, as illustrated here. Such valves are combinable also with the coalescence separator 200 which is shown schematically in FIG. 4 and described in the following.

The coalescence separator 200 comprises a preferably openable housing which is comprised of a first housing part 2100, namely a housing cover, and a second housing part 2200, namely a housing body. The second housing part 2200 comprises an inlet 2220 for the oil-containing air 500. In the housing, an in particular exchangeably insertable separating element 1000 is arranged which comprises at least a multi-layer structure 10 of coalescence filter medium stacked in multiple layers, a seal 2400 which is clamped seal-tightly between the housing parts 2100, 2200, and a support frame 2300 that is fixedly connected to the seal 2400 and the multi-layer structure 10. In other embodiments, a coil is conceivable. Within the housing 2100, 2200, the air 500 (a corresponding air flow 20 is indicated by an arrow) is purified by means of the multi-layer structure 10 of the coalescence filter medium. The resulting clean air 510 is guided from a clean room which is arranged in FIG. 4 to the left of the separating element 1000 via the clean air outlet 2120 of the housing cover 2100 back into the intake manifold of the internal combustion engine. Separated oil is discharged via an oil outlet 2300.

EXAMPLES

Embodiments of a coalescence separator according to the invention have been compared with three different other structures. In this context, different coalescence filter media have been employed. Separation degrees have been determined based on an aerosol with a volume-weighted average drop size of appr. 1.1 μm. The examples have been configured with respect to the respective number of layers with the goal that the pressure loss is within the range of 20 mbar for appr. 20 cm/s inflow speed. In this context, it is clearly apparent that the comparative examples comprise a comparatively minimal product of grammage and air permeability and a minimal performance capability in relation to the ratio pressure loss and separation degree. This is referred to often by factor of quality (quality factor) which is calculated as follows:

$$Q_f = \ln(1/P)/\text{delta } P,$$

wherein P=penetration=(1-separation degree) and wherein deltaP=pressure difference.

| | coalescence filter medium | grammage g/m² | air permeability l/m²s | thickness mm @ 10 kPA | product grammage * air permeability g/(m*s) |
|---|---|---|---|---|---|
| Examples | | | | | |
| example 1 | glass fiber paper with appr. 95% glass fibers | 108 | 1632 | 1.14 | 176 |
| example 2 | glass fiber paper with appr. 95% glass fibers | 220 | 723 | 1.96 | 159 |
| comparative examples | | | | | |
| comparative example 1 | glass fiber paper with appr. 95% glass fibers | 71 | 672 | 0.7 | 48 |
| comparative example 2 | glass fiber paper with appr. 95% glass fibers | 65 | 1212 | 0.56 | 79 |
| comparative example 3 | glass fiber paper with appr. 95% glass fibers | 75 | 817 | 0.64 | 61 |

| | number of fibers less than 3 μm | layers | separation degree % | pressure difference mbar | quality factor 1/kPa |
|---|---|---|---|---|---|
| examples | | | | | |
| example 1 | <10% | 5 | 86.2 | 17.8 | 1.11 |
| example 2 | <10% | 6 | 92 | 19.3 | 1.31 |
| comparative examples | | | | | |
| comparative example 1 | appr. 30% | 4 | 87.1 | 23.8 | 0.86 |

-continued

| | | | | | |
|---|---|---|---|---|---|
| comparative example 2 | appr. 30% | 4 | 85.1 | 24.8 | 0.76 |
| comparative example 3 | appr. 30% | 13 | 89.2 | 25.6 | 0.87 |

Examples 1 and 2 are in each case coalescence separators according to the invention which are embodied with two different embodiments of a coalescence filter medium that differ substantially in relation to the grammage. Both comprise a glass fiber proportion of 95% wherein the remainder is an incinerable binder mixture. In each case, 90% of the glass fibers of the coalescence filter medium contained in the coalescence filter medium comprise a fiber diameter between 3 μm and 7.5 μm and an average fiber diameter (d50) between 5 μm and 6 μm. It is clearly apparent that in both variants a separation degree of above (example 2) or approximately (example 1) 90% at a pressure loss below 20 mbar is achieved. Correspondingly, in both variants a quality factor of greater 1 is achieved. Example 2 in comparison to example 1 can even be produced somewhat better because the employed embodiment of the coalescence filter medium is less sensitive in regard to processing. In this respect and in particular in regard to the processing of glass fiber papers with a high glass fiber proportion as in the present examples of above 90% of the total weight, the use of coalescence filter media with a grammage of above 150 g/m², preferably above 180 g/m², can enable a good processing reliability and thus a fast manufacture. In an individual case, it can be advantageous for the production of a multi-layer structure according to the invention in mass production environments, in particular when producing coiled embodiments, to provide the coalescing filter medium with a carrier layer that is not separation-effective. In this way, the coalescence filter medium can be exposed to higher tensile forces and speeds during production. The carrier layer can be attached by lamination and should be, in particular so as to not significantly affect the homogeneity of the separation structure across the multi-layer structure, significantly thinner (at least four times thinner, preferably with a thickness of less than 0.25 mm) and more permeable (at least three times more permeable, preferably minimum air permeability 5,000 l/m²s) in comparison to the glass fiber paper. For this purpose, for example, a thin spun nonwoven with appr. 0.2 mm thickness and with high air permeability of, for example, appr. 6,500 l/m²s can be employed. Preferred are however carrier layer-free coalescence filter media.

Even though the comparative examples show an air permeability in a similar magnitude as the aforementioned examples, they have a reduced product of grammage and air permeability. It is moreover clearly apparent that already for minimal number of layers (comparative examples 1 and 2) a differential pressure of greater than 20 mbar is produced and no separation degree of 90% is achieved. In comparative example 3, a separation degree of almost 90% is indeed achieved but at the expense of the pressure loss which is above 25 mbar in this comparative example 3. In comparison to the aforementioned examples, all have a significantly reduced quality factor of below 0.9 in common.

Based on this, it is apparent from the comparison that a fine fiber proportion of significantly less than 30%, more precisely a comparatively minimal proportion of fibers with a diameter of less than 3 μm, can contribute significantly to reaching a structure optimized with regard to separation degree and pressure loss. The effect, as demonstrated, is clearly apparent for a proportion of less than 10% but a significant improvement is to be expected even for a proportion of less than 20%.

What is claimed is:

1. A coalescence separator for separating liquid droplets from a gas flow, the coalescence separator comprising:
    a gas inlet;
    a gas outlet;
    a multi-layer structure comprising a plurality of individual layers of a coalescence filter medium and arranged between the gas inlet and the gas outlet,
    wherein the coalescence filter medium comprises a glass fiber paper with glass fibers;
    wherein the individual layers of the coalescence filter medium each have an individual layer thickness of more than 0.8 mm and maximally 5 mm, a grammage of greater than 80 g/m² and less than 500 g/m², and an air permeability of 350 l/m²s to 1,800 l/m²s;
    wherein a mass proportion of incinerable materials contained in the coalescence filter medium amounts to maximally 10%.

2. The coalescence separator according to claim 1, wherein
    the multi-layer structure comprises between 2 and 80 of the individual layers.

3. The coalescence separator according to claim 2, wherein
    the individual layers are immediately arranged on each other and are either stacked or coiled.

4. The coalescence separator according to claim 1, wherein
    the coalescence filter medium is a single layer structure.

5. The coalescence separator according to claim 4, wherein
    the single layer structure is homogenous.

6. The coalescence separator according to claim 1, wherein
    a total grammage of the multi-layer structure, calculated by multiplying the grammage of the individual layers by the number of the individual layers, is between 500 g/m² and 8,000 g/m².

7. The coalescence separator according to claim 1, wherein
    a total air permeability of the multi-layer structure having the plurality of individual layers of a coalescence filter medium is between 15 l/m²s and 350 l/m²s.

8. The coalescence separator according to claim 1, wherein
    a product of the air permeability of the individual layers multiplied by the grammage of the individual layers amounts to between 110 g/m*s and 220 g/m*s.

9. The coalescence separator according to claim 1, wherein
    a mass proportion of the glass fibers of the glass fiber paper of the coalescence filter medium amounts to at least 90%.

10. The coalescence separator according to claim 1, wherein
the coalescence filter medium comprises a binder with a mass proportion of maximally 10%.

11. The coalescence separator according to claim 10, wherein
the binder contained in the coalescence filter medium contains no bi-component fibers or melt fibers.

12. The coalescence separator according to claim 10, wherein
the binder contained in the coalescence filter medium is an acrylate binder.

13. The coalescence separator according to claim 1, wherein
the grammage of the individual layers is greater than 100 g/m$^2$.

14. The coalescence separator according to claim 1, wherein
the air permeability of the individual layers is greater than 600 l/m$^2$s.

15. The coalescence separator according to claim 1, wherein
at least 90% of the glass fibers of the glass fiber paper of the coalescence filter medium have a fiber diameter of greater than 2.5 µm.

16. The coalescence separator according to claim 1, wherein
at least 90% of the glass fibers of the glass fiber paper of the coalescence filter medium have a fiber diameter of less than 10 µm.

17. The coalescence separator according to claim 1, wherein
the glass fibers of the glass fiber paper of the coalescence filter medium have an average fiber diameter of between 4 µm and 6 µm.

18. The coalescence separator according to claim 1, wherein
a finest separation stage of the coalescence separator is formed by the multi-layer structure.

19. The coalescence separator according to claim 1, wherein
a finest separation stage of the coalescence separator is formed by the coalescence filter medium.

20. The coalescence separator according to claim 1, wherein
a finest separation stage of the coalescence separator is formed by the multi-layer structure and the coalescence filter medium.

21. The coalescence separator according to claim 1, wherein
the multi-layer structure forms a separating stage of the coalescence separator that determines an efficiency of the coalescence separator.

22. The coalescence separator according to claim 1, wherein
the coalescence filter medium forms a separating stage of the coalescence separator that determines an efficiency of the coalescence separator.

23. The coalescence separator according to claim 1, wherein
the multi-layer structure and the coalescence filter medium form a separating stage of the coalescence separator that determines an efficiency of the coalescence separator.

24. The coalescence separator according to claim 1, wherein
the multi-layer structure comprises two or more differently configured ones of the individual layers of the coalescence filter medium.

25. A crankcase venting system comprising a coalescence separator according to claim 1.

26. The crankcase venting system according to claim 25, wherein
the crankcase venting system is a closed crankcase venting system of an internal combustion engine and the coalescence separator has no further fine separator or further fine separation layer.

* * * * *